United States Patent [19]

Peetz et al.

[11] Patent Number: 5,676,501
[45] Date of Patent: Oct. 14, 1997

[54] DRILL BIT TUBE

[75] Inventors: Wolfgang Peetz, Fronreute-Blitzenreute; Hans-Peter Meyen, Wolpertswende, both of Germany

[73] Assignee: Hawera Probst GmbH, Ravensburg, Germany

[21] Appl. No.: 629,746

[22] Filed: Apr. 9, 1996

[30] Foreign Application Priority Data

Apr. 27, 1995 [DE] Germany ............... 195 15 435.5
Jan. 27, 1996 [DE] Germany ............... 196 02 903.1

[51] Int. Cl.⁶ .............................................. B23B 51/05
[52] U.S. Cl. .................... 408/204; 408/206; 408/703
[58] Field of Search ............................ 408/204, 144, 408/206, 207, 224, 703

[56] References Cited

U.S. PATENT DOCUMENTS

| | | | |
|---|---|---|---|
| 1,887,374 | 11/1932 | Emmons | 408/144 |
| 3,382,743 | 5/1968 | Trevathan | 408/144 X |
| 3,495,359 | 2/1970 | Smith et al. | 408/204 X |
| 5,007,777 | 4/1991 | Itokazu | 408/206 X |
| 5,205,685 | 4/1993 | Herbert | 408/204 |
| 5,417,526 | 5/1995 | Stock et al. | 408/204 |
| 5,429,457 | 7/1995 | Asano et al. | 408/204 |

FOREIGN PATENT DOCUMENTS

| | | |
|---|---|---|
| 0295309 | 12/1988 | European Pat. Off. . |
| 0480263 | 4/1992 | European Pat. Off. . |
| 2529504 | 1/1984 | France .................. 408/206 |
| 2910299 | 9/1980 | Germany .............. 408/703 |
| 3530296 | 3/1987 | Germany . |
| 4242910A1 | 6/1994 | Germany . |
| 03019727 | 1/1991 | Japan . |
| 0585986 | 12/1977 | U.S.S.R. ................ 408/204 |

*Primary Examiner*—Daniel W. Howell
*Assistant Examiner*—Henry W. H. Tsai
*Attorney, Agent, or Firm*—Spencer & Frank

[57] ABSTRACT

A drill bit includes a one-piece cylindrical drill bit tube having a longitudinal axis and defining cylindrical surfaces including an inner cylindrical surface and an outer cylindrical surface. At least one of the cylindrical surfaces is configured to include deformations comprising at least one of embossments and recesses, all of the deformations appear over an entire length of the tube. At least some of the deformations are finite over the at least one of the cylindrical surfaces, the deformations further being adapted to stiffen the tube in the longitudinal direction without additional material reinforcements being disposed on the tube. The drill bit further includes hard-metal cutting elements disposed on a front face of the tube.

12 Claims, 4 Drawing Sheets

DRILL BIT TUBE

The invention relates to a drill bit including a cylindrical drill bit tube and cutting elements disposed on a front face of the drill bit tube.

Tubes for drill bits, in particular for diamond drill bits, are generally produced from soft structural steel in the form of drawn precision tubes. These tubes are enamelled as a rule, and also chromated in some cases. Thee have a uniformly round cross section from the drill bit right up to the cap region. In the case of small drill bits, typically at tube diameters less than 40 mm, thickened portions having milled-in grooves are sometimes made on the cutting-side end. These thickened portions are necessary so that the drilling segments can be attached with sufficient strength. The grooves in the thickened portions serve to receive the cuttings arising during the drilling.

Furthermore, drill bits for dry drilling have been disclosed which have bores located laterally opposite one another for removing the core located inside the drill bit after the drilling. Longitudinal slots right up to the cap are also sometimes provided. Cuttings are in turn received into these longitudinal slots during the drilling. In addition, similar to the round holes mentioned, they serve to remove the drilled core located in the drill bit. These longitudinal slots are only practicable for the dimensions of the so-called recess cutters (drilling depths 70 mm max.). Wet drilling bits, however, cannot have apertures, since otherwise there is a bypass in the flow of the flushing medium, which flows via the cap of the drill bit along the inside and past the drilling segments to the outside.

To improve the transport of the cuttings, tubes have additionally been disclosed on which a helix of small pitch is made at the outer periphery, which helix is a turned recess in most cases. For helices of this type, the material thickness has to be increased in order to ensure adequate tube stiffness. This results in a greater cutting width, for which greater driving power is consequently required during drilling.

All embodiments referred to above which deviate from the pure cylinder shape of the drill bit tube result in weakening of the axial stiffness of the drill bit tube. Accordingly, a large amount of material has to be used in the production of such drill bit tubes. Although the pure cylinder shape of a drill bit tube has good axial guidance features, it causes enormous friction due to the large area of the side walls coming in contact with the drilled walls. On the one hand, the drill bit has to cope with the heat arising here; on the other hand, correspondingly powerful machines are required for the drive of the drill bit.

DE 42 42 910 discloses a drill bit which has reinforcing ribs in the form of material reinforcements for improving the stiffness in the axial direction. However, making such material reinforcements means a significant additional expenditure in production.

SUMMARY OF THE INVENTION

The object of the invention is to propose a tube for a drill bit in which the friction is reduced during the drilling and at the same time the axial stiffness is improved, in which case the drill bit can at the same time be manufactured at little cost, in particular by shaping processes.

Accordingly, a drill bit tube according to the invention, on at least one circumferential surface thereof, has a structure which stiffens the tube in the axial direction without additional material reinforcement. Such a structure runs with a large axially parallel component in order to bring about precisely this stiffening in the axial direction. Due to the structuring of the circumferential surface, a closed cylindrical circumferential surface no longer comes in contact with the wall of the drill hole or the drilled core. In this way, reduced friction during the drilling is achieved in addition to the improved stiffness of the drill bit tube.

The advantages according to the invention are achieved solely by the shaping and not by additional material reinforcement. The wall thickness of the drill bit tube remains essentially unchanged by the structures. Such structures may be produced by shaping processes at relatively little cost, for example from flat material or from smooth cylinder tubes.

The circumferential surface structure is preferably made in the form of embossments or outward projections in the circumferential surface. Such embossments (or outward projections) may be embossed in the tube sheet via so-called roll embossing before the sheet is formed into the drill bit tube and longitudinally seam welded. However, embossing in continuously drawn cylindrical tubes would also be conceivable.

The embossments may further be made in a groove shape over the entire length of the tube and/or may be closed upon themselves, that is, may be finite over the cylindrical surface on which they appear. Here, groove-shaped embossments may run parallel with respect to the longitudinal axis in a straight manner or also in a curved or angular manner. In the embodiment where the embossments are closed upon themselves, they may be of a circular, elliptical or polygonal design.

For an axial stiffening effect it is always necessary for the directional component of the embossment in the axial direction to be more pronounced than the component parallel to the tube periphery. It is therefore advisable in the case of groove-shaped embossments to keep the deviations from the axially parallel course as small as possible.

In the case of embossments closed upon themselves, it is advantageous to configure circular or elliptical embossments such that the one semiaxis thereof again deviates only slightly from the axially parallel direction or does not deviate from it at all. Accordingly, of the polygonal embossments, rhombic embossments are to be preferred, the one diagonal of which deviates only slightly from the axially parallel direction or does not deviate from it at all.

In a special embodiment of the invention, the structure of the inner and/or outer circumferential surface of the drill bit tube may be achieved by the entire cross sectional profile of the tube being designed to deviate from a cylindrical shape. Such a profiled tube may be composed of a plurality of curved segments, for example four curved segments. However, polygonal tubular cross sections, e.g. in the form of regular polygons, are also conceivable. Furthermore, cross sections in which the tube wall is arranged in a corrugated manner around a circular line may also be considered.

The above cross sectional profiles may be obtained in different ways. For example, they may be produced by joining together individual tube segments, by shaping or folding a finished tube, e.g. of circular cross section, or else directly during the production of a tube, e.g. by extrusion.

In all designs of the drill bit tube proposed so far, the wall stiffness of the tube is considerably improved. Considerably thinner wall thicknesses can thereby be used for a drill bit tube. In addition, the area of friction at the drilled wall or at the outer wall of the drilled core is significantly reduced. This results in an effective reduction in the friction occurring during drilling. The consequence of this is that substantially lower driving power is necessary in order to drill with a drill bit according to the invention.

An additional advantage is obtained by twisting the embossing or the entire profiled tube in the opposite direction to the direction of rotation, as described above. Here, in contrast to a hitherto conventional helix of drill bits, the angle of twist of such a tube is more acute. For example, a typical pitch is between 5 cm and 20 cm for a full revolution of the embossing or of the cross section in the axial direction with drill bits having a periphery up to about 60 mm. In this case, the helix angle or angle of twist should not be greater than 45°. The increased stiffness of the tube is still ensured by these steep angles of twist, as a result of which the aforesaid smaller wall thicknesses are still possible.

In addition, specific delivery of the cuttings into the passages produced by the twisting of the embossing or cross sectional shaping is brought about in this embodiment.

A further advantage of a special embodiment of a drill bit, which in particular may have a tube of the type referred to above, resides in the fact that, instead of commercially available, curved and comparatively long drilling segments on the drilling end of the drill bit, shorter and straight drilling segments can now be used.

The segments, for example in the case of a profiled tube having a polygonal or corrugated cross section, are arranged at the maximum and minimum amplitudes respectively of the resulting peripheral lines. This results in a cutting division between various drilling segments. If a suitably short interval is selected between successive maximum and minimum amplitudes respectively, such straight, short drilling segments can be used without problem, which typically have a length of only 10–15 mm compared with a length of 20–30 mm in the case of drill bits of conventional type of construction. The decisive advantage when using short and straight drilling segments is that the same segments can be used for drill bit tubes of different diameter. A considerable cost advantage is thereby obtained due to the larger quantity of identical components. This advantage is also obtained in the case of drill bit tubes of the hitherto known type.

BRIEF DESCRIPTION OF THE DRAWINGS

Exemplary embodiments of the invention are shown in the drawings and are explained in more detail below. In the drawings.

DETAILED DESCRIPTION OF THE INVENTION

Figure 1:
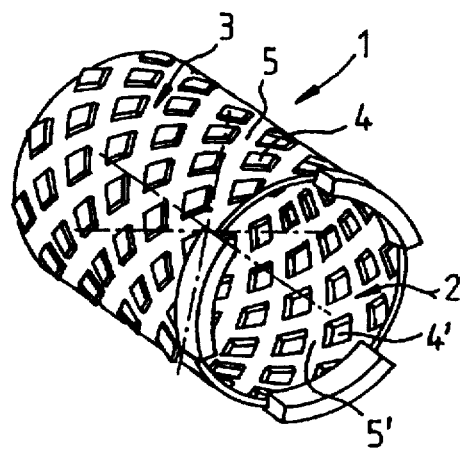
FIG. 1 shows a perspective representation of a drill bit tube embossed according to the invention.
Figure 2:
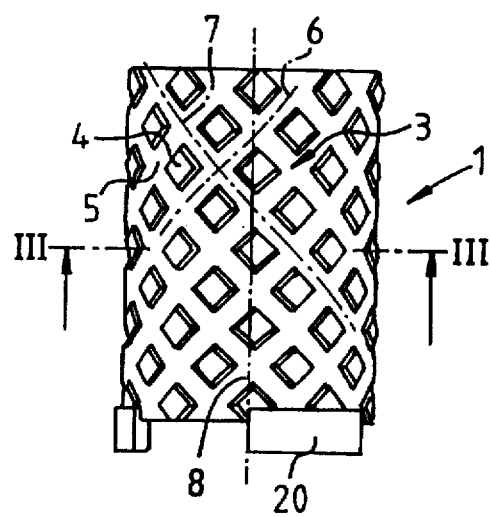
FIG. 2 shows a side view of a tube according to FIG. 1.

The drill bit tube 1 according to FIGS. 1 and 2 has an inner 2 and an outer 3 circumferential surface. The tube material is embossed in such a way that rhombic outward projections 4 are distributed over the entire outer circumferential surface 3. Each rhombic outward projection 4 is framed by a corresponding rhombic recess 5. The projections and recesses shown are, as can clearly be seen from FIGS. 1–5, finite over the cylindrical surfaces on which they appear. The complementary pattern results on the inner circumferential surface 2, i.e. rhombic inward projections 4' which are framed by corresponding rhombic prominences 5', so that the material thickness remains essentially the same overall.

In interrelationship, the rhombic recesses 5 produce continuous intersecting passages, as shown by broken lines 6 and 7 by way of example. These continuous passages 6, 7 run helically with a large pitch around the outer periphery of the drill bit tube 1 parallel to the side walls of the rhombic outward projections 4. In this case, the helix angle α is 45° for example. The rhombic outward projections 4 are oriented with their one diagonal parallel to the axis 8 of the drill bit tube 1. Drilling segments 20 configured as segments of circles are attached to the drilling side of the drill bit tube 1.

Figure 3:
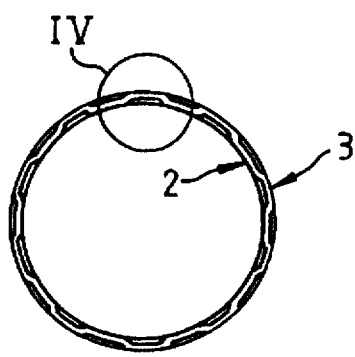
FIG. 3 shows a cross section along line III—III in FIG. 2.
Figure 4:
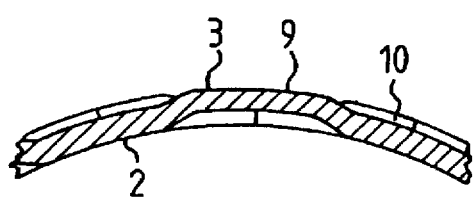
FIG. 4 shows an enlarged detail from FIG. 3.

The alternating sequence of prominences 9 and recesses 10 along the periphery of the drill bit tube 1 is illustrated in particular in FIGS. 3 and 4. The inner circumferential surface 2 is correspondingly designed to be complementary to the outer circumferential surface 3.

In addition to the advantages according to the invention, the improved wall stiffness and the reduced friction due to the smaller area of friction in contact with the drilled wall, which in this case is formed by the surface of the prominences 9, there is also an advantage due to the helically encircling passages 6 and 7 respectively. The removal of the cuttings is improved by these helical passages 6 and 7 respectively during the rotation of the drill bit.

Figure 5:
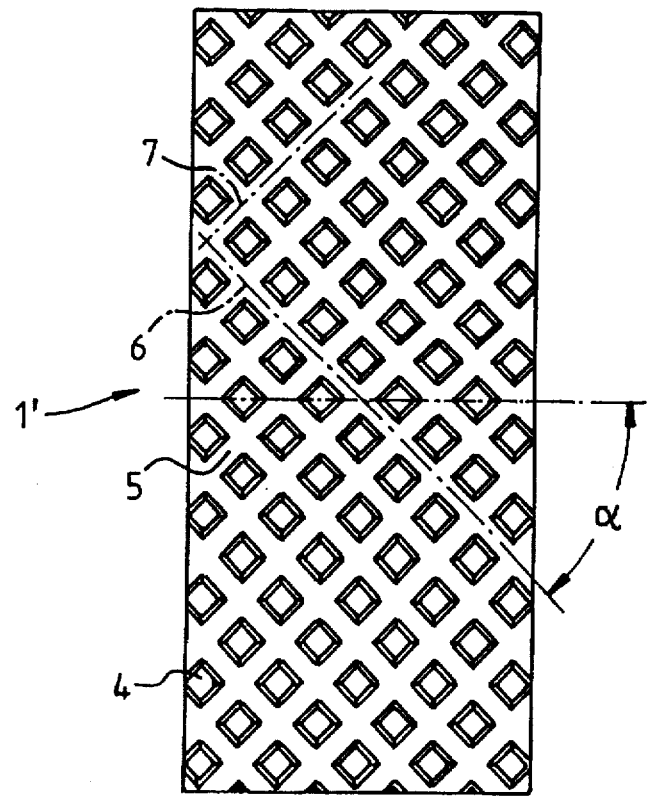
FIG. 5 shows a representation of a flat developed view of the tube according to FIG. 1.

The representation in FIG. 5 of the flat developed view 1' of the drill bit tube 1 shows how such a tube 1 can be produced from flat material. For example, embossing may be carried out in a sheet by roll embossing so that this sheet is given the profile of the developed view 1'. The drill bit tube is then produced by wrapping and welding, for example, and, as evident from the above-described process and from FIGS. 1–5, is a one-piece component.

Figure 6:
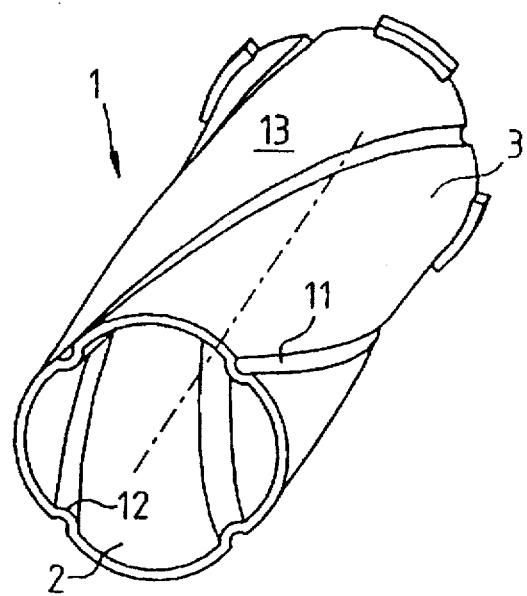
FIG. 6 shows a perspective representation of a profiled tube for a drill bit.
Figure 7:
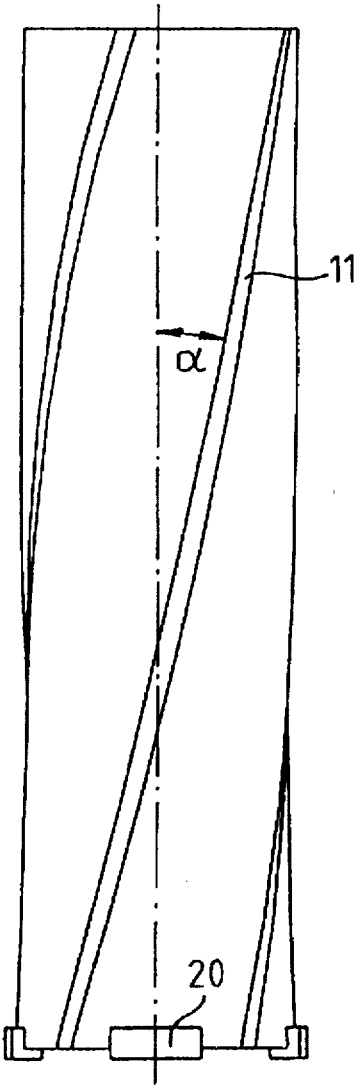
FIG. 7 shows a side view of an embodiment according to FIG. 5.
Figure 8:
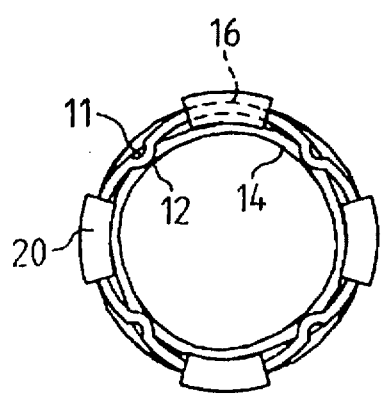
FIG. 8 shows an end view of a drill bit tube according to FIGS. 6 and 7.

FIGS. 6 to 7 relate to an exemplary embodiment in which the cross section deviating according to the invention from the cylinder shape is realized by channel-shaped grooves 11 of arcuate cross section. The arcuate cross section 12 of these grooves 11 can clearly be seen at the end face (see FIGS. 6 and 8). It also becomes clear here that the material is not reinforced. The drill bit tube 1 or parts thereof may be produced by shaping.

In the present embodiment, four grooves 11 of this type are formed in the drill bit tube 1. This results in four arcuate wall segments 13 between the grooves 11. The grooves 11 are formed in the wall of the drill bit tube 1 in such a way that they have a slight twist. It can be recognized in particular in FIG. 7 that the helix angle α is kept very acute here. The stiffening of the tube wall is increased in the axial direction by this arrangement of the grooves 11 having an acute helix angle α.

The grooves 11, which have been produced by suitable shaping, occur as a recess in the outer circumferential surface 3. At the inner circumferential surface 2, however, the grooves 11 constitute projections. In the case of a drill bit which is provided with such a drill bit tube 1, drilling is carried out between an inner 14 and an outer 15 circular envelope curve, as becomes clear in the end view of FIG. 8. Here, the wall segments 13 bear against the drilled wall only at their outermost prominences 16. Likewise, the drilled core in the interior of such a drill bit tube 1 is only touched by the grooves 11. This results in clearly reduced friction, as already explained several times.

Figure 9:
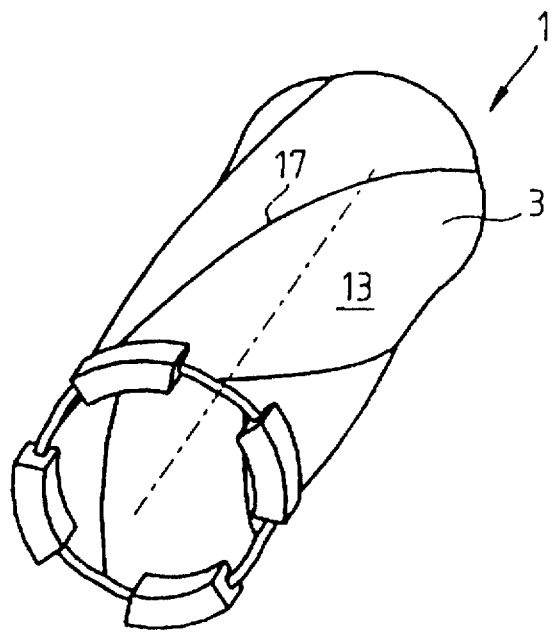
FIG. 9 shows a perspective representation of a further exemplary embodiment.
Figure 10:
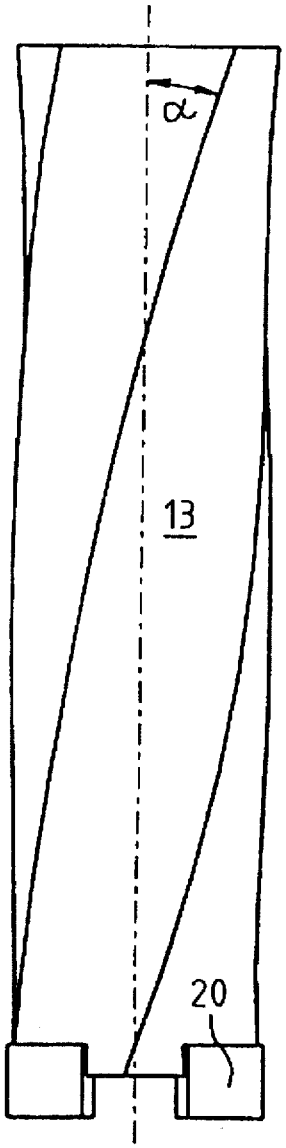
FIG. 10 shows a side view of a drill bit tube according to FIG. 9.
Figure 11:
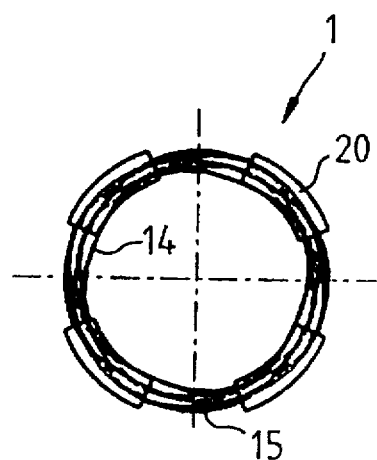
FIG. 11 shows an end view of an embodiment according to FIGS. 9 and 10, FIGS. 12 and 13 show two perspective representations of a further exemplary embodiment.

The embodiment according to FIGS. 9 to 11 is of similar construction to the embodiment described above. Here, however, flat connecting edges 17 produced by folding take the place of the grooves 11 shown in FIGS. 6–8, at which connecting edges 17 four arcuate wall segments 13 are joined together. The peripheral pattern of a drill bit tube of such a design has four points of maximum diameter in the region of the center of the wall segments 13 as well as four positions of minimum diameter in the region of the connecting edges 17. The embodiment of the drill bit tube i described may also consist of another number of wall segments 13. Both three and five wall segments or even a larger number would be conceivable.

As in the exemplary embodiment of the grooves 11 described above, the edges 17 in the present example have a slight twist in the opposite direction to the direction of rotation of the drill bit. The helix angle α is again kept very acute. Therefore, as in the preceding exemplary embodiments, increased wall stiffness of the drill bit tube 1 is again obtained.

As apparent in particular in FIG. 11 and as already mentioned, the center regions of the wall segments 13 form the regions which are at the greatest distance from the axis of rotation of the drill bit tube and thus rub against the drilled wall during the drilling. During the drilling, these outermost prominences move along an outer envelope curve 15, which in FIG. 10 is visible as an outer contour of the drill bit body on account of the twist present within the drill bit tube 1. The edges 17 follow the inner envelope curve 14 during the drilling. In the region of the edges 17, passages through which the cuttings can be discharged form between the outer circumferential surface 3 and the wall of the drill hole.

Figure 12:
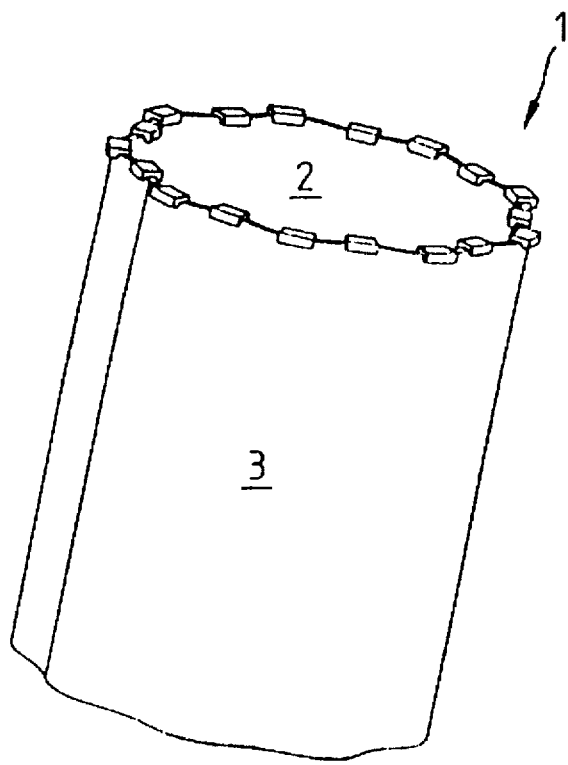
Figure 13:
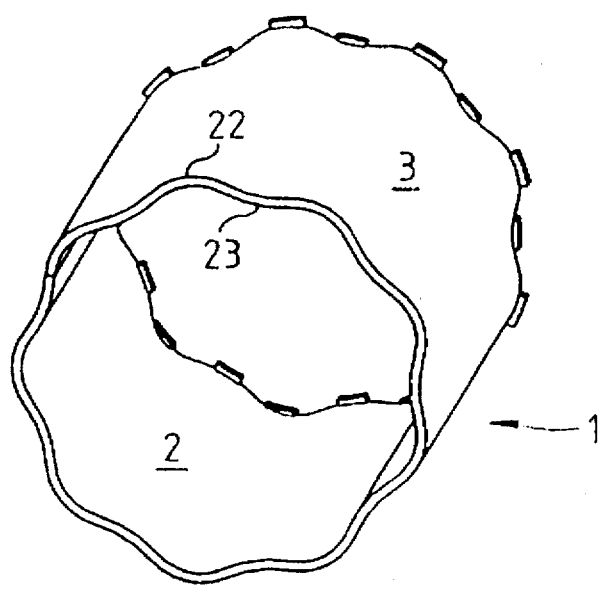
Figure 14:
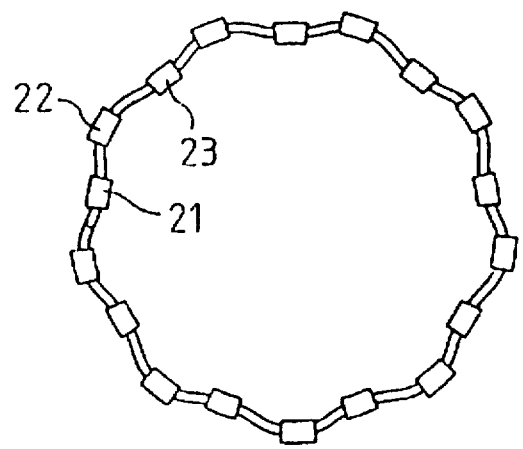
FIG. 14 shows an end view of an embodiment according to FIGS. 12 and 11.

The representation according to FIGS. 12 to 14 shows an exemplary embodiment of a drill bit tube 1 according to the invention in which the outer 3 and the inner 2 circumferential surfaces run in a corrugated manner along the periphery of a circular cylinder due to appropriate shaping of the tube wall. Short drilling segments 21 are attached to locations at a maximum 22 and minimum distance 23 respectively from the center or longitudinal axis of the drill bit tube 1. In contrast to the curved or arcuate drilling segments 20 of the aforesaid exemplary embodiments, the short drilling segments 21 are now no longer curved but straight. The periods of the corrugated structure are designed to be short enough that a sufficiently large number of the short and straight drilling segments 21 can in each case be attached at a minimum distance 23 and maximum distance 22 respectively from the longitudinal axis of tube 1 in order to achieve an adequate drilling result.

The drill bit tube may optionally be coated with a friction-reducing coating.

The corrugated design of the drill bit tube 1 results in axial stiffening thereof as in all previous embodiments. Likewise, the friction of the drill bit tube 1 in the drill hole is reduced, since the drill bit tube 1 can bear against the wall of the drill hole or the drilled core only at the locations at a minimum 23 and maximum distance 22 respectively from the axis of the drill bit tube.

Despite their different designs, all the exemplary embodiments described above are distinguished according to the invention by the fact that a stiffening structure is formed in at least one of the circumferential surfaces of the drill bit tube 1. These stiffening structures may either be oriented completely in the axial direction or be deflected from the axial direction in such a way that the stiffening effect is retained in the axial direction.

These deviations from the axial orientation of the formed structures enable, for example, a slight twist having an acute helix angle α to be incorporated in the drill bit tube for various shapes in order to obtain the additional advantage of the facilitated transport of the cuttings. It is important in this case, however, that the increased stiffening and the saving of material associated therewith as well as the reduced wall friction, as a result of which lower driving power becomes necessary during the drilling, are retained.

We claim:

1. A drill bit comprising:

a one-piece cylindrical drill bit tube having a longitudinal axis and defining cylindrical surfaces including an inner cylindrical surface and an outer cylindrical surface, at least one of the cylindrical surfaces being configured to include deformations comprising at least one of embossments and recesses, all of the deformations appearing over an entire length of the tube, at least some of the deformations being finite over the at least one of the cylindrical surfaces, the deformations further being adapted to stiffen the tube in the longitudinal direction without additional material reinforcements being disposed on the tube; and hard-metal cutting elements disposed on a front face of the tube.

2. The drill bit according to claim 1, wherein the at least one of embossments and recesses comprise rhombic outward projections and rhombic inward projections.

3. The drill bit according to claim 1, wherein the deformations comprise at least one of embossments and recesses each of which extend along the length of the tube in its entirety.

4. The drill bit according to claim 1, wherein the deformations comprise curved wall segments in a cross sectional profile of the tube perpendicular to its longitudinal axis.

5. The drill bit according to claim 1, wherein the deformations comprise a polygonal cross sectional profile of the tube perpendicular to its longitudinal axis.

6. The drill bit according to claim 1, wherein the deformations comprise a corrugated pattern along a circular periphery of the tube in a cross sectional profile of the tube perpendicular to its longitudinal axis.

7. The drill bit according to claim 1, wherein the deformations comprise at least one of embossments and recesses which are formed by an entire cross sectional profile of the tube perpendicular to its longitudinal axis, the deformations further comprising at least one of embossments and recesses disposed thereon.

8. The drill bit according to claim 1, wherein the deformations define a twist along the length of the tube defining an acute angle of twist α.

9. The drill bit according to claim 1, wherein the cutting elements comprise short drilling segments.

10. The drill bit according to claim 9, wherein the drill bit tube includes a friction-reducing coating thereon.

11. The drill bit according to claim 10, wherein the short drilling segments are between 10 mm and 15 mm long.

12. The drill bit according to claim 10, wherein the short drilling segments are not curved.

* * * * *